US 6,651,422 B1

(12) United States Patent  (10) Patent No.: US 6,651,422 B1
LeGare  (45) Date of Patent: Nov. 25, 2003

(54) CATALYST EFFICIENCY DETECTION AND HEATING METHOD USING CYCLIC FUEL CONTROL

(76) Inventor: Joseph E. LeGare, 21925 Maplewood, Southfield, MI (US) 48034

( * ) Notice: Subject to any disclaimer, the term of this patent is extended or adjusted under 35 U.S.C. 154(b) by 0 days.

(21) Appl. No.: 09/722,273

(22) Filed: Nov. 28, 2000

Related U.S. Application Data

(63) Continuation of application No. 09/379,357, filed on Aug. 23, 1999.
(60) Provisional application No. 60/097,557, filed on Aug. 24, 1998.

(51) Int. Cl.$^7$ ................................................. F01N 3/00
(52) U.S. Cl. ............................. 60/277; 60/274; 60/284; 60/285
(58) Field of Search .......................... 60/274, 284, 285, 60/277, 282, 299

(56) References Cited

U.S. PATENT DOCUMENTS

| | | | |
|---|---|---|---|
| 5,211,011 A | 5/1993 | Nishikawa et al. | 60/284 |
| 5,289,678 A | 3/1994 | Grutter | 60/277 |
| 5,339,628 A | 8/1994 | Maus et al. | 60/277 |
| 5,355,671 A | 10/1994 | Maus et al. | 60/274 |
| 5,357,928 A | 10/1994 | Ohtsuka | 60/284 |
| 5,414,994 A | 5/1995 | Cullen et al. | 60/274 |
| 5,428,956 A | 7/1995 | Maus et al. | 60/277 |
| 5,435,172 A | 7/1995 | Pelters et al. | 60/277 |
| 5,462,039 A | * 10/1995 | Mamiya et al. | 60/284 |
| 5,497,617 A | 3/1996 | Bagley et al. | 60/274 |
| 5,592,815 A | 1/1997 | Jelden et al. | 60/274 |
| 5,600,948 A | 2/1997 | Nakajima et al. | 60/276 |
| 5,610,844 A | 3/1997 | Maus et al. | 60/274 |
| 5,626,014 A | 5/1997 | Hepburn et al. | 60/274 |
| 5,630,315 A | 5/1997 | Theis et al. | 60/274 |
| 5,649,420 A | 7/1997 | Mukaihira et al. | 60/274 |
| 5,657,625 A | 8/1997 | Koga et al. | 60/274 |

(List continued on next page.)

FOREIGN PATENT DOCUMENTS

| | | | |
|---|---|---|---|
| JP | 04-308311 | * | 10/1992 |
| JP | 09-088663 | * | 3/1997 |

OTHER PUBLICATIONS

Se H. Oh, "Thermal Response of Monolithic Catalytic Converters During Sustained Engine Misfiring: A Computational Study", Society of Automotive Engineers, SAE 881591, 1988.

(List continued on next page.)

Primary Examiner—Thomas Denion
Assistant Examiner—Diem Tran
(74) Attorney, Agent, or Firm—Wolff Law Offices; Kevin Alan Wolff

(57) ABSTRACT

An automobile engine's catalytic converter is heated by inducing a change in the engine's fuel injection delivery that varies from normal operating conditions. Heating the engine's catalytic converter by changing the engine's fuel injection delivery is useful in enabling the catalytic converter to achieve efficient operating temperature quicker and enables efficient and accurate diagnosis of catalyst degradation. Diagnosis of degraded catalyst performance is accomplished by measurements of the catalyst's temperature characteristics following alternating of the fuel delivery to different cylinders from lean and rich fuel conditions that differ from the mass ratio of air to fuel being at chemical stoichiometric conditions. Measurements of the catalyst's temperature characteristics with defined modifications of an engine's operating conditions allows determining the catalytic converter's gas conversion effectiveness. Commonly available temperature sensing devices are used to measure the exothermic heat generation in a portion of the evaluated catalytic converter for comparison to the temperature characteristics of a known catalyst's conversion effectiveness.

48 Claims, 3 Drawing Sheets

U.S. PATENT DOCUMENTS

| | | | |
|---|---|---|---|
| 5,661,971 A | * 9/1997 | Waschatz et al. | 60/274 |
| 5,675,967 A | 10/1997 | Ries-Mueller | 60/274 |
| 5,706,652 A | 1/1998 | Sultan | 60/274 |
| 5,732,549 A | 3/1998 | Treinies et al. | 60/274 |
| 5,845,492 A | 12/1998 | Isobe et al. | 60/284 |
| 5,896,743 A | 4/1999 | Griffin | 60/274 |
| 5,945,597 A | 8/1999 | Poublon et al. | 60/277 |
| 5,974,785 A | * 11/1999 | Cunningham et al. | 60/284 |
| 5,974,790 A | 11/1999 | Adamczyk et al. | 60/274 |
| 5,974,793 A | 11/1999 | Kinugasa et al. | 60/285 |
| 5,983,627 A | 11/1999 | Asik et al. | 60/274 |
| 6,014,859 A | 1/2000 | Yoshizaki et al. | 60/285 |
| 6,041,591 A | * 3/2000 | Kaneko et al. | 60/284 |

OTHER PUBLICATIONS

Clifford D. Tyree. "Emission Levels and Catalyst Temperatures as a Function of Ignition–Induced Misfire", U.S. Environments Protection Agency, SAE 9202298, 1992.

T. Ma, N. Collings, T. Hands, "Exhaust Gas Ignition (EGI)—A New Concept for Rapid Light–Off of Automotive Exhaust Catalyst", SAE 920400, 1992.

Wei Cai and Nick, Collings, "A Catalytic Oxidation Sensor for the On Board Detection of Misfire and Catalyst Efficiency", SAE 922248, 1992.

Collings, Cai, Ma and Ball, "A Linear Catalyst Temperature Sensor for Exhaust Gas Ignition (EGI) and On Board Diagnostics of Misfire and Catalyst Efficiency" SAE 930938, 1993.

O'Sullivan and Will, "The Effect of Intermittent Engine Misfire and Air to Fuel Ratio Excursion on Exhaust Catalyst Temperature", SAE 940927, 1994.

Legare and Tamai, "High Temperature Measurements for On–Board Diagnostics of LEV/ULEV Systems", SAE Technical Paper Series, SAE 942054, Oct. 17, 1994.

Kato, Ikoma, and Nishikawa, "Exhaust Gas Temperature Sensor for OBD–II Catalyst Monitoring", SAE 960333, pp. 129–135, 1996.

Eade, Hurley, Rutter, Inman and Bakshi, "Fast Light–Off of Underbody Catalyst Using Exhaust Gas Ignition (EGI)", SAE 952417, pp. 127–133, 1995.

Hepburn and Meitzler, "Calculating the Rate of Exothermic Energy Release for Catalytic Converter Efficiency Monitoring", SAE 952423, pp. 189–206, 1995.

* cited by examiner

CATALYST EFFICIENCY DETECTION AND HEATING METHOD USING CYCLIC FUEL CONTROL

This application relates to provisional application Ser. No. 60/097,557, filed on Aug. 24, 1998, and this application is a continuation of U.S. patent application Ser. No. 09/379,357 filed Aug. 23, 1999, which are incorporated herein by reference for all purposes.

BACKGROUND OF THE INVENTION

1. Field of Invention

The present invention relates to catalytic conversion of exhaust gases for internal combustion engines, and more particularly of heating a catalytic converter using cyclic fuel control and to detecting deterioration of efficiency of catalysts.

2. The Related Art

Catalysts for engine exhausts are used to convert unburned or partially reacted gases that are mostly made up of hydrocarbon (HC), carbon monoxide (CO), and nitrogen oxides ($NO_x$) components. Gases leaving the exhaust manifold of an internal combustion engine enter the inlet of a device called a catalytic converter. A catalytic converter is the device that provides an expansive area where these gas components are oxidized to carbon dioxide ($CO_2$), nitrogen ($N_2$), and water vapor ($H_2O$) by catalyst materials such as platinum (Pt), palladium (Pd), and rhodium (Rh). The conversion of these gases to $CO_2$ $N_2$ and $H_2O$ results in an exothermic chemical reaction at the catalyst surface that causes an increase in the temperature of the gases leaving the outlet side of the catalyst element. Increasing the concentrations of unburned or partially reacted gases entering the catalyst will result in a temperature rise that can be used to determine the catalyst's conversion efficiency as well as to heat it. A catalytic converter can be made up of several catalyst bed elements (CE) that provide a large effective surface area for the catalyst material. Each catalyst element may have different oxidation characteristics for the gases entering from the engine's exhaust manifold.

Other methods for determining the catalyst's conversion efficiency by monitoring the level of the chemical or exothermic reactions occurring within a catalytic converter have been proposed in the past. Detection of the catalyst's efficiency with a chemical method usually incorporates the use of two oxygen sensors placed at the inlet and the outlet portions of the catalytic converter catalyst elements being monitored. The voltage versus time characteristics of the two oxygen sensor's output signals provides an indication of the catalyst's ability for storing oxygen for chemical oxidation reactions. The catalyst's oxygen storage capacity causes a difference between the catalyst's inlet and outlet oxygen sensor signals. Since the catalyst's oxygen storage capacity decreases after extended high temperature operation, the sensors output voltage versus time characteristics become more similar as the catalyst's ability to store oxygen drops to zero.

However, the method using two oxygen sensors suffers from at least two problems. First, the accuracy of the oxygen sensor deteriorates over time thus creating sources of errors in detecting the actual deterioration in catalyst capability. For example, chemical factors such as fuel additives or sulfur concentrations can adversely affect the dual oxygen sensor method of catalyst efficiency monitoring. Second, the oxygen sensor method is dependent on the amount of active ceria in the catalyst rather than the catalyst's oxidation conversion efficiency that is dependent on the other active precious metals. This results in a highly nonlinear relationship between catalyst efficiency and oxygen storage capacity that decreases the accuracy of catalyst efficiency monitoring. Catalyst efficiency durability characteristics sometimes are compromised to improve the correlation with the oxygen storage capacity and allow adequate catalyst monitoring accuracy.

Exothermic energy is also released at the catalyst's surface during the chemical oxidation of hydrocarbons, carbon monoxide and nitrogen oxides ($NO_x$) gases as they are converted into water vapor and carbon dioxide. The exothermic energy released in the catalyst causes a temperature increase at the surface of the catalyst's substrate and in the exhaust gases flowing past this surface. Monitoring this temperature increase, caused by the exothermic energy release at the catalyst's surface, provides a second method for measuring the catalytic converter's overall chemical conversion performance.

Two primary methods have been proposed that monitor the catalyst's gas conversion capability by using the catalyst's temperature characteristics for determining its level of exothermic energy release. The first method uses two or more temperature sensors to monitor the temperatures of both the gases entering and exiting the desired portion of catalyst elements of the catalytic converters to be monitored. While flowing through the catalytic converter, each catalyst element's outlet gas temperatures increase to a steady state level above its inlet exhaust gas temperatures depending on the exothermic energy released at the catalyst's surface. Under some relatively steady state vehicle operating conditions, the temperature differences between the gases entering and exiting the portion of the catalytic converter being monitored provides an indication of the catalyst's condition. U.S. Pat. Nos. 5,592,815 and 5,630,315 apply this first method of catalyst temperature detection during periods of steady state engine operating conditions. The steady state temperature difference between the inlet and outlet catalyst temperature sensors in a properly functioning catalytic converter can be about 50–80° C. This compares with a catalyst having insufficient conversion efficiency with an indicated temperature sensor difference (outlet minus inlet) of 10–40° C.

The second method of temperature based catalyst monitoring uses a momentary disabling of the ignition system voltage to the engine's spark plugs to cause an unburned fuel and air mixture to exit the engine's exhaust. The time period of disabling the ignition system must be short in order to prevent the torque change from the engine to be noticed by the vehicle's driver. This pulse of unburned fuel and air mixture subsequently enters the catalyst and causes a sudden, momentary temperature rise of the catalyst's temperature for a short time period. Quick responding temperature sensors are required to monitor this sudden and brief temperature rise at various portions within the catalyst where the unburned fuel and air mixture are oxidized. Temperature sensors must also be placed at the proper location where the unburned exhaust pulse will be oxidized since most catalytic converters have multiple catalyst elements with differing precious metal catalyst makeup. The location where the pulse will be oxidized is dependent on the instantaneous temperatures of each catalyst element. Identification of the instantaneous catalyst element temperatures and the location where the unburned exhaust pulse is oxidized can require multiple temperature sensors to be placed at various locations within the catalytic converter. This second method and related systems are shown in, for example, U.S. Pat. Nos. 5,339,628, 5,435,172, 5,355,671 and 5,610,844.

These two methods are dependent upon the ability of temperature detection devices or temperature sensors to accurately detect small temperature differences with magnitudes between 10–50° C. Monitoring of the catalyst's condition is performed during short time periods between 5–30 seconds when engine speed and load conditions are relatively stable. Normal temperature fluctuations caused by exhaust gases entering the catalyst during the catalyst efficiency monitoring time period are difficult to be accurately discerned from temperature changes caused by the catalyst's exothermic reactions. Multiple temperature sensors are sometimes required with these methods to more accurately discern only temperature changes associated with the test for catalytic efficiency and its related exothermic chemical activity.

In the first method of monitoring, both the catalyst's inlet and outlet temperature sensor's error characteristics must remain very stable over the life of the engine in order to provide adequate detection of catalyst performance. This stability is required in the sensor's output because a difference of only 10–40° C. between the temperatures of the catalyst's inlet and outlet gases can indicate the difference between a good versus failed catalyst. Conventional temperature sensors output errors can increase by more than 10° C. during the catalyst's useful lifetime. Also, the system to which the temperature sensor is connected can introduce additional measurement errors of a few degrees and further aggravate the accuracy of catalyst detection methods which depend on temperature differences below 40° C. Therefore, small changes in the temperature sensor's error characteristics during the catalyst's lifetime and systematic error margins could cause an incorrect indication of the catalyst's efficiency and result in premature replacement of the catalytic converter.

In the second method of catalyst pulse temperature monitoring, the long term accuracy stability of the temperature sensor is less critical since the detection method uses a temperature difference over a period of a few seconds. During this short time period, there's no perceptible change in the sensor's absolute output temperature reading. However, the second catalyst monitoring method requires the sensor's response speed to closely follow the momentary catalyst gas temperature changes that occur after a pulse of unburned fuel and air enter the catalyst. This requires the temperature sensor's time response characteristics to quickly follow the momentary temperature changes caused by the unburned exhaust pulse being oxidized as it passes through the catalyst. Changes in the sensor's response time characteristics during the catalyst's useful lifetime will affect the measured values of temperature change versus time characteristics required in the second method. The sensor's response time characteristics must therefore be very stable over the sensor's and catalyst's useful lifetime for the second catalyst monitoring method to be practical. Variations in a sensor's response time characteristics are caused by factors such as gas flow rates, catalyst radiant temperatures and aging. These factors are difficult to compensate for and add potential error sources when the period of catalyst efficiency testing evaluation is below 20 seconds.

Thus, these two methods require, that the temperature sensors accuracy to be very stable or response time characteristics to be very fast and stable over the catalyst's and engine's useful lifetime. Both of these requirements place high demands on temperature sensors that must operate at conditions of frequent temperature cycling and extremes exceeding 1000° C. These requirements can significantly increase the cost of the sensor in order to meet both the performance and life expectancies when applying these two prior catalyst monitoring methods.

Further, each of the catalyst temperature monitoring methods are affected by many factors associated with normal engine operation. Temperatures of the inlet gases entering the catalytic converter can fluctuate due to the varying heat content of the engine's exhaust gases at different speed (revolutions per minute or RPM), load conditions (torque) and other factors occurring in normal engine operation. Some transient engine operating conditions can result in large momentary variations in the air and fuel mixture entering the catalyst and these can affect the catalyst's temperatures during a brief time period. These transient conditions could therefore introduce large potential errors in the second catalyst temperature monitoring method.

SUMMARY OF THE INVENTION

One purpose of this invention is to provide a method of consistently heating a monitored portion of a catalytic converter to cause an increase in the catalyst element's temperature that can be accurately measured. Monitoring the exothermic characteristics of the catalyst element is not dependent upon chemical factors such as fuel additives or sulfur concentrations that can affect the dual oxygen sensor method of catalyst efficiency monitoring.

One objective of the present invention is to provide a system and method for controlling the engine's fuel flow to provide a significant change in the catalyst's operating conditions over a long time period that will provide conditions for inducing large, exothermic temperature changes that can be consistently monitored using durable, economical and practical temperature sensors.

Another objective of this invention is to provide a system and method for controlling the engine's fuel flow to increase the rate of a catalyst's heating shortly after the engine is started (engine startup), when temperatures are below 200° C. in the catalyst, preferably without the use of an auxiliary air pump. It is advantageous to be able to quickly heat the catalyst after a cold start with the use of no auxiliary air pump or by using a smaller flow rate air pump to improve the system's cost and reliability. An electrically or belt driven auxiliary air pump is sometimes used on engines to inject air directly into the exhaust system, at locations such as the exhaust manifold or into the catalytic converters, for temporarily providing excess oxygen into the engine's exhaust system. An increasing number of engines will use an auxiliary air pump to help oxidize CO or hydrogen based fuel molecules at the catalyst elements' surfaces, so that tail pipe emissions can be significantly reduced during cold engine start and warm-up, because of future emission regulations. Catalyst heating can be also be accelerated by controlling the engine to have a richer air-fuel mixture and then adding excess air with an air pump to produce exothermic reactions at the surfaces of the catalyst. Controlling the fuel rates to the engine's individual fuel injectors, to provide excess oxygen into the catalyst, is an alternative method to reduce or eliminate the requirement of an air pump.

Cycling the catalyst's inlet exhaust gas air-fuel ratio between rich and lean, by controlling the fuel quantities delivered to the fuel injectors 15 for each engine cylinder or groups of cylinders, provides an increased source of chemical energy to react at the catalyst elements' surfaces. The catalyst's inlet gas operating conditions are changed for a short time period following the initiation of exothermic catalytic activity using a cyclic fuel control heating method similar to that being proposed herein for use in diagnosing catalyst efficiency. The cyclic fuel control method proposed herein provides for varying the quantities of fuel delivered to the engine's cylinders in a manner which produces alternating rich and lean cylinder exhaust gas air-fuel ratio characteristics that feed into the desired catalyst element. This system and method of heating a catalyst will provide increased level of chemical energy entering the catalyst that may combine exothermically for heating the catalytic converter to an efficient catalyst temperature quickly after initial engine startup and for diagnosing the efficiency of the catalyst.

Availability of cost effective temperature sensors with either, or both, long term accuracy stability and quick response to changes in the measured gas temperatures are the main challenges associated with prior art of catalyst efficiency detection employing temperature monitoring. A description of practical temperature sensors that can operate in the extreme high temperature environments within an engine's exhaust system can be found in SAE technical paper number 942054 "High Temperature Measurements for On-Board Diagnostics of LEV/ULEV Systems" by T. Tamai et al. These include temperature sensing devices such as thermocouples, thermistors and platinum resistive temperature devices (RTD) with established performance capabilities. Temperature sensors, with output characteristics that can reach 64% of the total measured gas step temperature change within a period of 5–10 seconds following the occurrence of the input gas temperature change, are considered to be quickest available designs. Quick responding and durable exhaust temperature sensors are typically referred to as having a response time of between 5–10 seconds.

In the present invention, a standard, high temperature, temperature sensor is placed in close proximity to the gas exit for only one of the catalyst bed elements in a catalytic converter that is selected to be monitored for determining the overall deterioration of the catalyst's performance. The length, location and volume of the catalyst element to be monitored are together selected to provide a correlation between the overall catalytic converter's gas conversion (chemical oxidation) efficiency and its temperature profile characteristics following a step change in exhaust gas levels of CO, HC and air. The temperature increase of the gases, caused by the exothermic oxidation reactions in an active catalytic converter, is dependent on the mass of unburned gases entering and the conversion efficiency of the respective catalyst material(s) for each gas. Accordingly, a catalyst is heated and a degradation in the catalyst's conversion efficiency is detected by changing the concentration of CO, HC and oxygen in the engine exhaust gases entering an appropriately designed catalytic converter element and monitoring the temperature increase of the gases exiting this catalyst element. The temperature increase is provided in the present invention by cycling the fuel rate to the engine's cylinders to cause a sufficiently large fluctuation in the air-fuel ratios of the gases entering in to the catalytic converter over a reasonable period of time during which the standard temperature sensor is able to detect a significant temperature change. The cycled cylinder groups are controlled in such a manner that the aggregate gas mixture is controlled to be, for example, at or near stoichiometric conditions and thus provide the necessary temperature increase while maintaining smooth engine rotation and minimizing tail pipe emissions. Therefore, the present invention is capable of providing a method of heating and monitoring the catalytic converter efficiency without adversely affecting the smooth engine rotation performance or fuel economy expected by a motor vehicle operator.

Further, with the present invention, the time period selected to cycle the exhaust gas air-fuel conditions to cause an elevated catalyst operating temperature may be controlled for a period of 50 seconds, or longer so the temperature sensor's response time characteristics are not significant sources of measurement errors. The minimum time duration necessary is dependent upon engine and vehicle exhaust system design characteristics. Using an extended time period for operating the catalyst at elevated temperatures reduces sources of measurement errors associated with variations in catalyst aging and temperature sensor response time characteristic. The time period for using cyclic fuel is controlled by the engine control unit's (ECU's) 7 based upon values stored in its electronic memory and input control system parameters such as engine speed, engine load and catalyst element temperature for each specific engine and catalyst configuration. This provides the ability to accurately monitor the catalyst's conversion efficiency while minimizing the total emissions from a vehicle's tail pipe. A calibrated time period sufficient to accurately detect a catalyst's conversion efficiency depends on the catalyst, engine and overall vehicle design. Specific calibrations for both the time duration and magnitude of fuel cycling for causing a catalyst temperature change are required due to large variations in engine characteristics such as displacement, cylinder number, manifold characteristics and other design parameters.

BRIEF DESCRIPTION OF THE DRAWINGS

The above and other objects, advantages and features of the present invention will be apparent from the following description taken in conjunction with the accompanying drawings, in which.

DETAILED DESCRIPTION OF THE INVENTION

Figure 1:
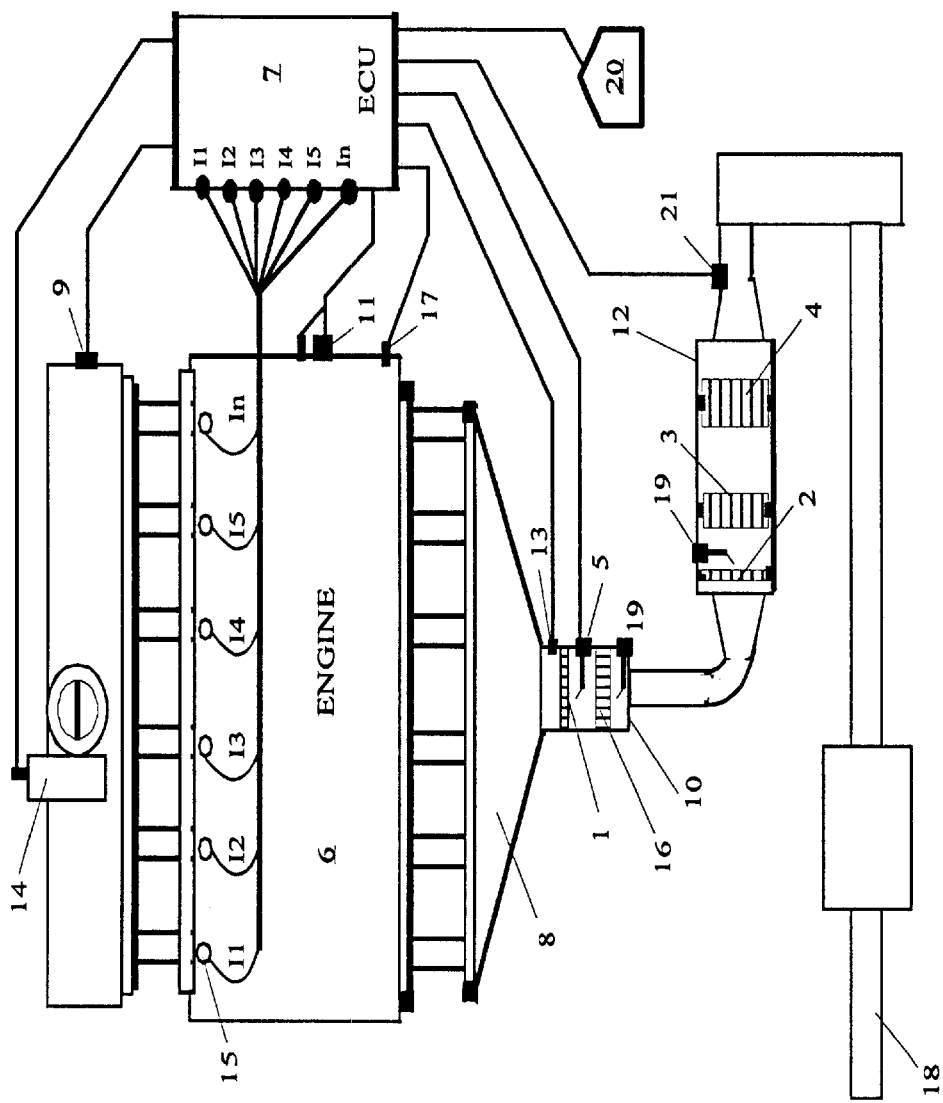
FIG. 1 shows a diagram of one preferred embodiment of the internal combustion engine catalytic converter efficiency monitoring and verification system of the present invention.

Future regulations require the ability to monitor the conversion efficiency of the catalyst elements within a catalytic converter used on the exhaust system of an internal combustion engine. One such system is shown in FIG. 1. Though the engine shown is an in-line cylinder configuration, others such as 'V' type and opposed cylinder configurations are also implied. The catalyst is used to convert toxic emissions into safe gases when it's working properly. In order to meet these future regulations some engines will be equipped with multiple catalytic converters 10 and 12 placed close to the engine's 6 exhaust manifold 8 and also further downstream from the engine 6. Monitoring of the catalyst's operating efficiency will be required to alert the driver when high levels of toxic exhaust gases are being emitted through the use of a catalyst malfunction indicator 20.

As shown in FIG. 1, the internal combustion engine's exhaust manifold 8 attached to a typical catalytic converter assembly is controlled by an engine control unit 7 (ECU). This engine control unit 7 can be an electromechanical or an electronic device that controls the amount of fuel delivered to the cylinders feeding exhaust gases into the catalyst element to be heated. For example, a microprocessor type control unit having an electronic memory capability to allow storage for values such as engine and vehicle system dependent variables with formats such as a multidimensional lookup table(s), constants, or multiple input parameter equations modeling the desired output characteristics. Defined threshold conditions or calibrated values may be stored in the ECU memory which may be, for example, a non-volatile formats such as ROM or EEPROM. The ECU 7 has the ability to process control system input operating parameters such as engine speed, temperatures, load and others to control the engine's operation by selecting the appropriate dependent values stored in ECU memory. The catalytic converter assembly is, for example, composed of a preheat catalytic converter 10 attached to the exhaust manifold 8 using a single or double catalyst bed element 1, 16 (CE1, CE2) and a main catalytic converter 12 (MC2) that may contain one or more additional catalyst bed elements 2, 3 and 4 (CE2, CE3, CE4). Catalyst element 2 can be located in either catalytic converters 10 or 12 depending on system design requirements and this alternately located catalyst element is designated as 16 when located in the preheat converter 10. In some configurations the preheat catalytic converter 10 mounted directly to the exhaust manifold 8 might be eliminated due to system design factors such as space limitations. A catalyst temperature sensor 5 is positioned at the exit of the first catalyst bed element 1 or alternately at the exit of second catalyst bed element (2 or 16) or third element 3. The gases exiting from the final catalyst element 4 in the main catalytic converter 12 and into the vehicles tailpipe 18 determine the overall level of hydrocarbon, carbon monoxide and nitrogen oxide emissions that enter the atmosphere as pollutants.

The ECU 7 has control of each fuel injector's 15 (or injector grouping) fuel delivery amount into the engine's intake manifold and cylinder. The output of the engine speed sensor 11 provides information on both the engine's speed of rotation (RPM) versus time and an indication of when each of the engine's cylinders have a combustion event. The ECU 7 uses, for example, a digital control system with the sensor inputs 5, 9, 11, 13, 17, 21 and other parameters to determine the fuel injector's 15 injection on time and resulting quantity of fuel injected during each engine combustion cycle. Predetermined values for the amount of fuel delivered are retained in digital memory storage in the form of, for example, a multidimensional table lookup values based upon ECU 7 input operating parameters.

When the mass ratio of air to fuel is at chemical stoichiometric conditions, the amount of air and fuel are in chemical balance to allow carbon dioxide, nitrogen and water vapor to be the main end products. A common terminology used to describe when the amount of fuel and air entering the engine's cylinders is in chemical balance is to use a value of $\lambda=1$ to denote the engine is operating at stoichiometric conditions. Correspondingly it's common to describe a lean condition with $\lambda>1$ when there is less fuel than needed to meet chemical stoichiometric requirements. A rich operating condition is then said to have $\lambda<1$ when there is more fuel than needed to meet chemical stoichiometric requirements. Here, the value $\lambda$ is defined as the ratio of each cylinder's exhaust gas air-fuel ratio to the chemical stoichiometric air-fuel ratio.

The ECU 7 controls the quantity of fuel delivered to each individual fuel injector devices 11, 12, 13, 14, . . . $I_n$ based upon information from the ECU 7 control system input parameters such as the engine's load sensor 9, engine speed sensor 11, engine coolant temperature sensor 17 and the closed loop fuel control oxygen sensors 13 and 21. During closed loop fuel control, sensors 13 and 21 provides feedback to the ECU 7 for maintaining the average air-fuel ratio of exhaust gases entering the catalytic converter to be at stoichiometric chemical conditions. Oxygen sensor 21, located at the outlet of the catalytic converters 10 or 12, may be used to trim the closed loop control point based upon the oxygen level after the catalysts. The ECU 7 can also be used to control the engine load condition using an optional motorized throttle body air flow control mechanism 14 based upon driver power demands. The actuator device 14 allows filtering of rapidly fluctuating changes in driver power demands or can directly follow the driver accelerator pedal inputs. This throttle actuator device 14 is not specifically required to diagnose the state of the catalyst's conversion efficiency though it can be used to enhance the accuracy of catalyst monitoring. Under normal operating conditions, the oxygen sensors 13 and 21 are used by the ECU 7 to provide closed loop fuel control so that the gases exiting the engine's exhaust manifold 8 may be at stoichiometric conditions with $\lambda=1$. Under this condition the three way catalyst elements (e.g. 1 and/or 2 or 16, etc.) are able to convert most exhaust gases into $CO_2$, $N_2$ and $H_2O$. The engine coolant temperature sensor 17 output provides input into the ECU 7 and may be used to determine one of the engine operating conditions to enable or disable cycling fuel control modulation. The coolant sensor 17 may also be used in selecting the magnitude of the engine exhaust air-fuel ratio fluctuation levels entering the catalyst to generate chemical heating energy.

Availability of cost effective temperature sensors with long term accuracy stability, and quick response to changes in the measured gas temperatures are the main challenges associated with prior art of catalyst efficiency detection employing temperature monitoring. To countermand this problem the present invention provides a system and method for controlling the engine's fuel flow to provide a significant change in the catalyst's operating conditions over a reasonably long time period sufficient to provide conditions for inducing large, exothermic temperature changes that can be consistently monitored using durable, economical and practical temperature sensors. A description of practical temperature sensors that can operate in the extreme high temperature environments within an engine's exhaust system can be found in SAE technical paper number 942054 "High Temperature Measurements for On-Board Diagnostics of LEV/ULEV Systems" by T. Tamai et al. These include temperature sensing devices such as thermocouples, thermistors and platinum resistive temperature devices (RTD) with established performance capabilities. Temperature sensors with output characteristics, that can reach 64% of the total measured gas step temperature change within a period of 5–10 seconds following the occurrence of the input gas temperature change, are considered to be quickest available designs. Quick responding and durable exhaust temperature sensors are typically referred as having a response time of between 5–10 seconds.

Unlike other systems, the present invention can use a single standard, high temperature, temperature sensor placed near the gas exit for one or more catalyst bed element in a catalytic converter that's selected to be monitored for determining the overall deterioration of the catalyst's performance. The length, location and volume of the catalyst element to be monitored are together selected to provide a correlation between the overall catalytic converter's gas conversion (chemical oxidation) efficiency and its temperature profile characteristics following a step change in exhaust gas levels of CO, HC and oxygen. The temperature increase of the gases, caused by the exothermic oxidation reactions in an active catalytic converter, is dependent on the mass of unburned gases entering and the conversion efficiency of the respective catalyst material(s) for each gas. Heating rates of the catalyst may be changed by different exhaust flow rates caused by engine speed or load changes. It is desirable to provide a method of consistently heating the catalyst, that is being monitored for conversion efficiency, to improve the accuracy for detecting catalyst degradation. The operating conditions for allowing catalyst monitoring should therefore be selected when transient engine operations would have minor effects on catalyst temperature. Accordingly, a catalyst is heated and a degradation in the catalyst's conversion efficiency is detected by changing the concentration of CO, HC and oxygen in the engine exhaust gases entering a catalytic converter element and monitoring the temperature increase of the gases exiting this catalyst element.

Inducing a transient step change in the concentrations of unburned catalyst inlet gases will cause a corresponding step temperature change of the catalytic converter outlet gas temperatures based upon the catalyst's oxidation efficiency and the inlet exhaust gas components. The temperature increase is provided in the present invention by cycling the fuel rate to groups of engine cylinders which causes a large fluctuation in the gases entering into the catalytic converter over a reasonable period of time during which the standard temperature sensor is able to detect a significant temperature change. The cycled cylinder groups may be controlled in such a manner that in sum total they are at or near stoichiometric conditions and thus provide the necessary temperature increase while maintaining smooth engine rotation. The heating of the catalyst by cycling the fuel rates to the engine cylinders may also be used to heat the catalytic converter for purposes such as to quickly heat the converter to reach a temperature needed for high catalyst gas conversion efficiency, such as after cold engine starting. During cold engine starting conditions, the aggregate air-fuel ratio of exhaust gases entering the first catalyst element 1 may be controlled to have excess oxygen or be near stoichiometric to optimize the heating rate. Therefore, the present invention is capable of providing economical heating and monitoring of catalytic converter efficiency without adversely affecting the smooth engine rotation performance expected by a motor vehicle operator.

Inducing a change in the gas concentration of HC, CO and oxygen in the engine's exhaust gases allows mainly the effects of a catalyst's temperature change, caused by exothermic chemical reaction, to be monitored. Temperatures of each individual catalyst element are dependent on both the concentration of chemically reactive gases entering its inlet and the conversion efficiency of its active catalytic surface. Creating a predetermined change in the chemical energy levels of the exhaust gases entering the catalyst will cause a subsequent change in the temperatures exiting the catalyst element as these gases are oxidized by catalytic action. Controlling the conditions of these chemically reactive gases in a pre-established manner, that produces a consistent method for heating the catalyst, allows the resulting catalyst temperature characteristics to be monitored and compared to known catalyst elements with acceptable and unacceptable conversion efficiency. Monitoring the temperature change characteristics of the gases exiting the catalyst provides an indication of the magnitude of the catalyst's exothermic reactions or alternately, the effectiveness of the catalyst's oxidation capability. Typically, most of the chemical oxidation of CO and HC gases will occur in the catalyst element with the highest catalytic activity.

The magnitude of the increase in CO, hydrogen based fuel molecules like HC and oxygen gas concentration entering the catalyst can be selected using the engine control unit 7 (ECU). The ECU 7 is used to control the engine fuel injector's 15 flow rate to individual or groups of firing cylinders. Modulating the fuel flow in a cyclic manner to each individual cylinder, or groups of cylinders, from a rich to lean to rich condition, produces an exhaust gas flow with higher concentrations of oxygen, CO and hydrogen based fuel molecules in the gases entering the first catalyst element. This process of cycling the injector's fuel rates to produce alternating rich and lean conditions is termed "cyclic fuel control modulation" or "fuel (rate) cycling" to differentiate it from normal closed loop fuel control that is used during the majority of the engine's operational time. Cyclic fuel control modulation results in a higher than normal level of chemically reactive exhaust gases that are subsequently oxidized in a normally functioning catalyst element to cause a large step change in its outlet temperature. (See, for example, the dash-dotted temperature line in FIG. 2 which illustrates cyclic fuel control modulation that causes a large temperature rise of a catalyst with good conversion efficiency compared to a corresponding low efficiency catalyst also shown by the respective dotted temperature line(s). This step change in outlet temperature is selected to far exceed the short term transient catalyst temperature output fluctuations resulting from normally varying catalytic converter inlet gas temperature and air-fuel ratio conditions. Further, cyclic fuel control modulation affect on the respective individual cylinder's exhaust gas air-fuel ratios entering the catalyst's inlet are illustrated in FIG. 3.) The frequency range for the rich-lean-rich exhaust gas cycling caused by cyclic fuel control modulation is controlled between about 5 and 120 Hertz. This operating range depends on factors such as the engine's speed, the arrangement of cylinders feeding exhaust gases into the target catalyst and the total number of engine cylinders.

The effectiveness of catalyst heating, caused by cyclically varying the fuel flow being delivered to an engine's cylinders, can be optimized by adjusting the frequency of the rich to lean fuel conditions in adjacent cylinder groups. Varying the number of cylinders that are grouped together to alternately operate at rich and lean conditions, allows the cycling exhaust gas conditions to match the frequency response characteristics of the catalyst element being monitored for temperature change. The frequency of the rich to lean exhaust gas conditions entering the catalyst element are dependent on both the engine speed and the number of grouped cylinders that are alternately operated at richer and leaner than stoichiometric requirements. As engine speeds increase this means more cylinders would need to be grouped together in order to maintain a constant frequency of exhaust gas air-fuel ratio cycling.

A catalyst's temperature can be increased by 200° C. by disabling fuel delivery on only a single engine cylinder during closed loop fuel control as shown by SAE technical paper number 920298 titled "Emission Levels and Catalyst Temperatures as a Function of Ignition Induced Misfire" by Clifford D. Tyree of US EPA. However, completely disabling the fuel delivery to an engine's cylinder causes a large torque pulsation that can be perceived by the driver as engine vibration.

Torque fluctuations can be minimized by limiting the change in fuel quantity delivered to each individual cylinder to deviate from normal stoichiometric fuel conditions in a range of ~10% to 40%. This means that cylinder groups with excess fuel would be less than 140% of the stoichiometric fuel rate while the cylinders with insufficient fuel would not drop below 60% of stoichiometric requirements. The maximum deviation from stoichiometric is limited by each engine's tolerance to misfire, that results when there is excessive or insufficient fuel for complete combustion. Misfire can cause inconsistent catalyst heating rates that would affect the accuracy of the catalyst efficiency monitoring. Fortunately, it is possible to dynamically detect misfire by evaluating engine speed fluctuation and so accurate catalyst monitoring can be performed when misfire levels remain below a calibrated threshold stored in the ECU 7 memory. Improvements in the future engine designs, such as high energy ignition systems, may increase the misfire tolerance to allow deviations of 40% or more from stoichiometric operation and therefore enhance the effective catalyst heating rates possible.

The aggregate engine exhaust air-fuel ratio conditions can be maintained close to stoichiometric operation by controlling the average fuel rate over one complete rich-lean-rich cycle of adjacently firing engine cylinder groups to provide for this result. Aggregate engine exhaust air-fuel ratio conditions can also be controlled for improved fuel economy by limiting the average fuel rate, among adjacently firing groups of engine cylinders, to be less than stoichiometric fuel conditions when catalyst NOx emissions are of limited concern.

The magnitude of the catalyst temperature increase can be controlled between 40–250° C. through the use of various fuel control modulation techniques when a properly functioning catalytic converter is used. FIG. 3 shows one of the possible combinations of controlling the fuel rates to individual cylinder groupings to cause varying magnitudes and cycling patterns for the air-fuel ratio perturbations from stoichiometric engine operation. Rapidly inducing a catalyst temperature change of this magnitude reduces the potential for incorrect catalyst efficiency detection caused by varying engine operating conditions and exhaust gas temperature changes of less than about 40° C. that occur at frequencies below 1 Hertz. Use of a large induced catalyst element temperature increase also provides decreased sensitivity to error sources caused by normal transient air-fuel ratio conditions during varying engine operation. Some of these are described in SAE technical paper # 940927 titled "The Intermittent Engine Misfire and Air to Fuel Ratio Excursions on Catalyst Temperature" by R. D. O'Sullivan et al.

The response time characteristics of temperature sensors used for catalyst monitoring are affected by many factors such as the initial catalyst temperature, radiant heat sources and gas flow velocity or localized turbulence conditions around the sensor. These factors are described in SAE technical paper #942054.

In the present invention, the time period selected to cycle the exhaust gas air-fuel conditions and cause an elevated catalyst operating temperature can be controlled typically between 30 and 200 seconds, or longer. The desired time period for catalyst heating depends upon factors such as the response time of the catalyst sensor 5, catalyst element thermal mass characteristics and other engine or vehicle system design characteristics. The duration of the period used for detection of catalyst efficiency performance is selected to be, for example, a value equal to approximately 400% of the time constant value for the catalyst temperature sensor. This allows the sensor's output to stabilize near a steady state value during catalyst temperature monitoring. Due to this long monitoring time period, momentary engine transients and the temperature sensor's response time characteristics are not significant sources of measurement errors. The specific time duration is selected based upon engine and vehicle exhaust system component design characteristics. Using an extended time period for operating the catalyst at elevated temperatures reduces sources of measurement errors associated with variations in engine system and temperature sensor response time characteristic. This monitoring time period may be reduced when improvements in catalyst temperature sensors 5, due to the state of art; result in faster time response characteristics.

The time period for using cyclic fuel modulation is stored as a calibrated value within the ECU's 7 electronic memory based upon operating parameters such as engine speed, engine load and catalyst element temperature for each specific engine and catalyst configuration. This calibrated time period is adjusted depending on the catalyst, engine and overall vehicle design to provide accurate detection of overall catalytic conversion efficiency. Specific calibrations for both the time duration, frequency and magnitude of fuel cycling characteristics for causing a catalyst temperature change are preferable due to large variations in engine characteristics such as displacement, cylinder number, manifold characteristics and other design parameters.

Normal engine operation causes a gradual degradation of the catalyst's gas oxidation conversion activity due to high operating temperatures and contamination of the catalyst metals. The increase in the catalytic converter temperature, caused by exothermic reaction at the catalytic surface areas, decreases as the catalyst's performance degrades. The volume and particularly the length of the catalyst element in the direction of the gas flow are selected to provide a close correlation between the monitored catalyst element's outlet gas temperature change characteristics, after enabling cyclic fuel control modulation, and the overall level of catalytic conversion capability. The location of the temperature sensor is selected to correlate the temperature change characteristics caused by enabling cyclic fuel control modulation with the desired level of catalyst activity degradation necessitating catalytic converter replacement. A temperature measuring device or sensor is appropriately placed near the gas exit for one of the properly designed catalyst elements (1, 16, 2, 3, etc.) to allow determination of when the overall catalytic converter's efficiency falls below a desired threshold. The sensor's location 5 or 19 is selected so it may monitor catalytic conversion efficiency during conditions of both transient warm-up after cold engine starting and stabilized catalyst operation. The sensor's location also determines the magnitude of temperature change that occurs from a catalyst with unacceptable conversion efficiency after cyclic fuel control modulation is enabled or disabled.

A catalyst's capability to oxidize gases does not reach its maximum conversion capability until after the catalyst's-temperature exceeds 200° C. for many catalysts. The gases leaving an inactive or cold catalytic converter under 100° C. are similar to the unburned gases that are entering the catalyst from the engine. Most of the emissions that exit the final catalyst bed element into the tailpipe 18, after an engine is started cold, are produced during the period while the catalytic converter is below the catalyst's activation temperature for chemical oxidation. The temperature of the catalytic converter catalyst bed element nearest the engine's exhaust manifold is usually the first to reach the catalytic activation temperature when no other catalyst heating methods are used. The oxidation conversion capability of the first and second catalyst bed element therefore significantly determines the total mass of unburned gases or pollutants that exit the final catalytic converter after an engine has been started from a cold condition. The front surface of the first catalyst bed element is normally the first to deteriorate due to contaminants and high temperature operation. The surfaces of the catalyst element nearest the engine's exhaust manifold are also the first to show decreases in catalyst activity or gas conversion efficiency due to contamination and high temperature deterioration of their catalytic materials. It is for these reasons, that the first or second large volume (size>0.5 liter) catalyst element's are the preferred locations for temperature sensor placement to monitor the temperature change profile for determining when the catalytic converter performance drops below an acceptable level and requires replacement.

Creating a transient step change in unburned inlet gas concentrations entering catalysts 10 or 12 allows monitoring of the degradation of a catalyst's chemical conversion efficiency by measuring the resulting temperature change of the gases exiting the catalyst. Characteristics of the catalyst element's 1, 2 or 16 temperature change during the period ranging from just near the time of enabling cyclic fuel control modulation until a short calibrated period following the subsequent disabling of fuel cycling is evaluated to determine if catalyst's conversion efficiency if acceptable. Both the magnitude and transient time rate of change characteristics of the monitored catalyst element outlet's temperature may be used to decide the catalyst's conversion efficiency. Enabling cyclic fuel modulation causes both a sudden and large catalyst temperature change based mainly upon the chemical energy of the exhaust gases entering the catalyst and the catalyst's oxidation conversion efficiency.

The magnitude of the catalyst temperature change, caused by cyclic fuel control, provides a large desired signal level versus other undesired levels of potential measurement errors or temperature fluctuation (noise) sources. Some measurement noise sources can include system errors from varying engine transient fuel conditions and changes in temperature measuring device (sensor) accuracy or its time response characteristics during its operational life. Cyclic fuel control modulation can result in a large catalyst temperature change exceeding 100° C. with a properly operating catalyst over a significant time period of 30–200 seconds to reduce the affect of error sources related to prior art for temperature based catalyst efficiency monitoring.

Determination of sufficient levels of the catalyst's conversion efficiency are decided by observing the temperature profile characteristics occurring after causing a change in state of cyclic fuel modulation operation. This state change causes a large difference in the catalyst's operating temperature that allows detection of a catalyst's steady state conversion efficiency. Further determination of the catalyst's efficiency may be identified by recording the selected catalyst element's temperature versus time characteristics during the catalyst's warm-up period. The performance of the catalyst is critical during this warm-up period since the majority of total engine emissions occur during the first few minutes after engine starting.

Catalyst monitoring is used to determine when it is time for indicating low catalytic efficiency if the catalyst's temperature increase after enabling cyclic fuel modulation falls below a threshold established by test measurements on known catalysts with unacceptable conversion efficiency. This criteria may also be modified if the catalyst temperature at the time of an increased rate of temperature rise, that's associated with the initiation of exothermic oxidation reactions following cold engine starting and referred to as catalyst light-off, occurs at a temperature higher than a catalyst with known unacceptable levels of cold start conversion efficiency.

Further, in the present invention large changes in catalytic converter efficiency can be detected by using a single, readily available temperature sensor as described in SAE technical paper number 942054. Catalyst condition detection is determined, for example, by causing large catalyst temperature changes through control of fuel flow to each grouping of cylinders with the application of a specified voltage time period from the ECU 7 to each of the individual fuel injectors 15 ($I_n$). The catalyst temperature sensor 5 is positioned at the appropriate location near the exit of the catalyst elements, for example 1, 2 or 16, in order to provide close correlation between overall catalytic converter conversion efficiency and the monitored profile characteristics of temperature versus time following cyclic fuel rate modulation. The optimal location for the sensor is determined based upon measured temperature versus time characteristics of the catalyst temperature sensor 5, based upon prior measurements of known reference degraded catalytic converters 10 or 12, during both catalyst warm-up and after a controlled change in the engine's 6 individual cylinder's air-fuel ratio conditions using cyclic fuel control modulation.

A large change in the exhaust gas composition is induced by varying the fuel quantity delivered to sequential or non-sequential groupings of fuel injector(s) 15 ($I_n$) versus time. This causes exhaust gas air-fuel ratio fluctuations of significantly greater magnitude and frequency characteristics than normal engine operation and subsequently changes the steady state levels of chemical energy available to a functional catalyst element. Large changes in catalyst operating temperatures result from the two steady state levels of exothermic chemical energy release conditions created by enabling and disabling cyclic fuel control modulation. A standard temperature sensor is used to monitor these two operating temperature conditions to discern the state of the catalyst's chemical conversion efficiency. The maximum change in catalyst temperature induced by fuel control modulation may be determined based-upon measured temperature characteristics of both good and marginally effective catalytic converters. Catalyst element size and sensor location are selected to provide a catalyst delta temperature change following cyclic fuel modulation, with a catalytic converter at the low efficiency limit, to be at least 40° C. below those when using a catalytic converter with adequate gas conversion efficiency performance.

The change in the absolute temperature accuracy characteristics of the sensor over hundreds of hours of operation does not significantly affect the accuracy of catalyst efficiency monitoring with this invention. This is due to the absolute temperature reading error being canceled out in the formation of the delta temperature term used to assess the level of catalyst activity. The delta temperature term is created by the subtraction of the two operating temperature states caused by enabling and then disabling of cyclic fuel control modulation, that results in an abrupt change in the catalyst's operating conditions. The two catalyst operating temperatures result from these two discrete states of exothermic heat generating conditions caused by cycling and not cycling the exhaust gas air fuiel ratio. The delta temperature change in catalyst temperature versus time, following a change in the state of cyclic fuel control modulation, is used to assess the catalyst's condition. Engine and vehicle operating conditions that are used to enable cyclic fuel modulation include parameters such as engine speed, load, coolant temperature, catalyst temperature, prior operational conditions, vehicle speed, transmission gear position, engine throttle position, and other parameters that establish optimum monitoring conditions.

Figure 2:
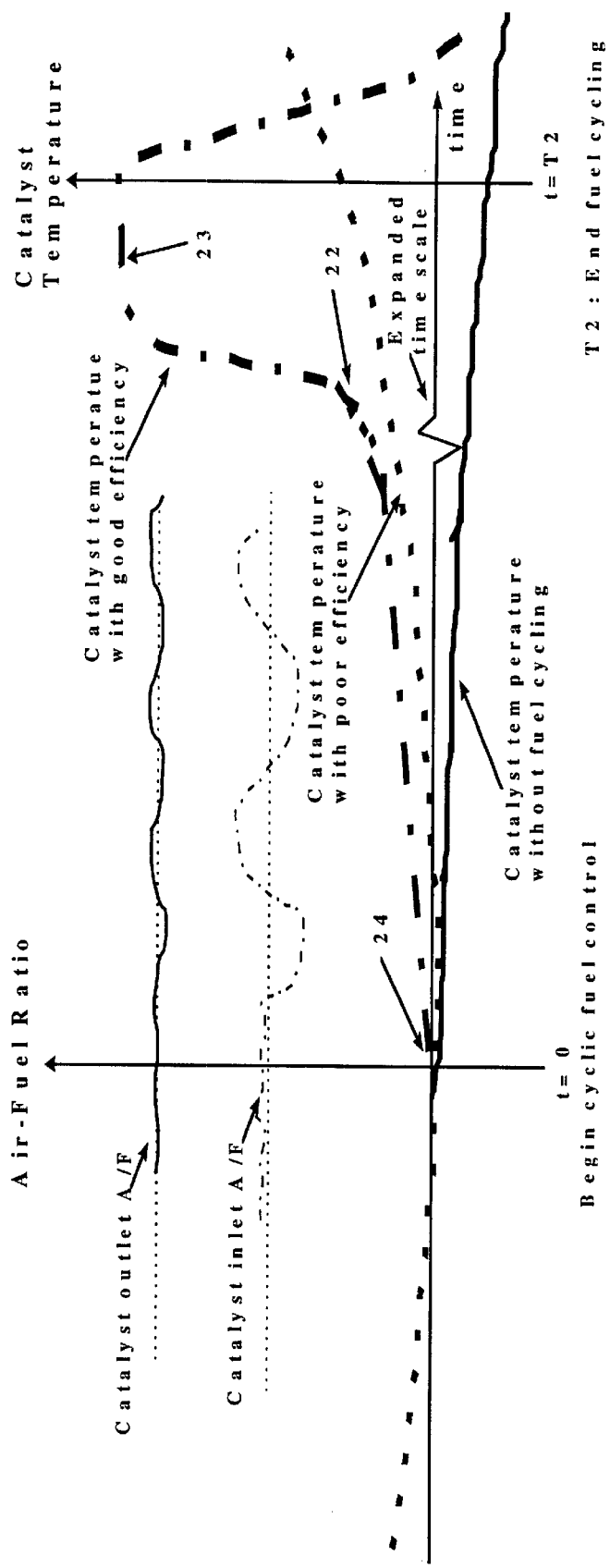
FIG. 2 shows a graph illustrating the effects on the catalyst's temperature due to cycling the fuel rate to groups of engine cylinders that feed exhaust gases into the selected catalytic converter, according to one preferred embodiment of the present invention.
Figure 3:
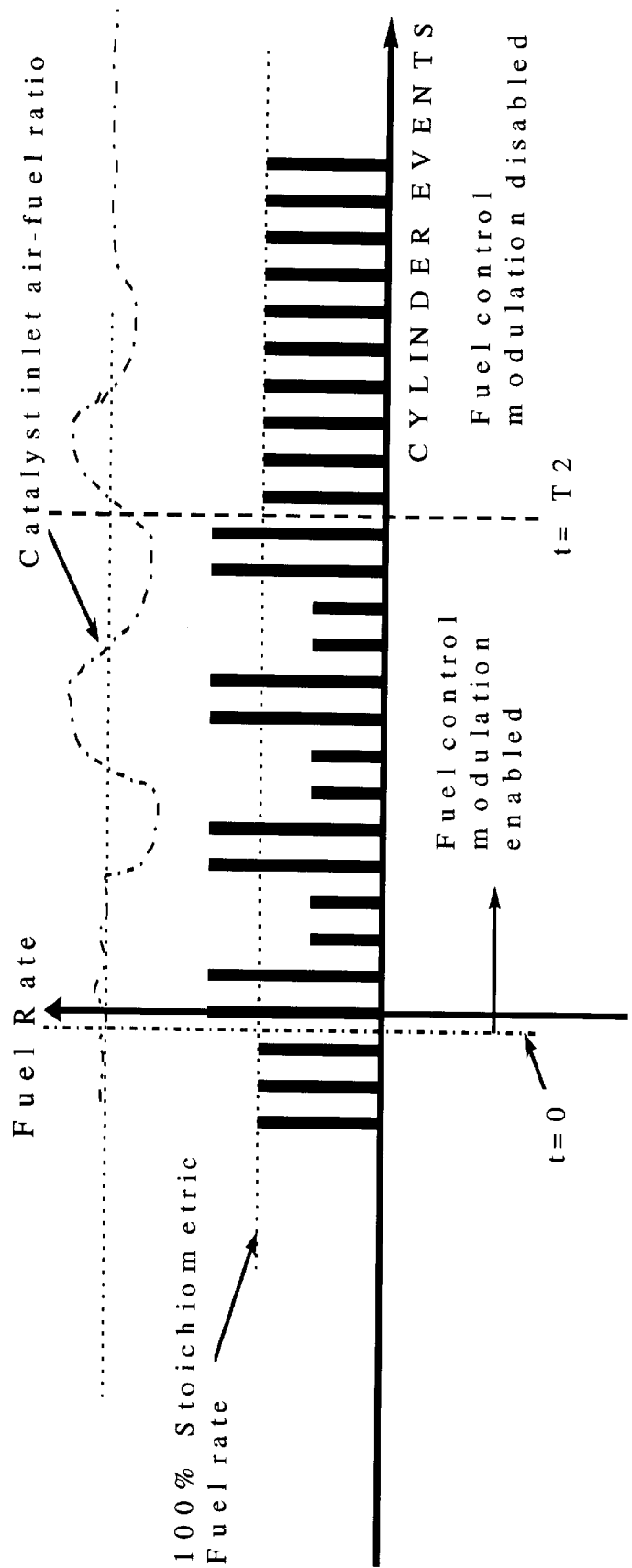
FIG. 3 shows one of the various alternate methods to cycle the magnitude and frequency of fuel rates for individual cylinder events to obtain alternating conditions between rich to lean and returning to rich for one complete rich-lean exhaust gas air-fuel ratio cycle entering the catalyst's inlet, according to one preferred embodiment of the present invention.

FIG. 2 illustrates the effects of cycling the fuel rate to groups of engine fuel injectors which results in large fluctuations in the composition of gases exiting exhaust manifold 8 into the closely coupled catalyst 10 or the main catalytic converter 12. The output of the catalyst temperature sensor 5 monitoring the selected catalyst element(s) (1, 2, 16) shows typical temperature versus time characteristics of a catalyst with good and poor conversion efficiency as illustrated in FIG. 2. Both the magnitude and rate of change of the temperature profile following the enabling and disabling of cyclic fuel modulation are monitored to determine when catalyst conversion efficiency performance is unacceptable. The solid temperature line in FIG. 2 illustrates a catalyst's temperature characteristics declining between time t=0 and t=$T_2$ and shows what occurs when fuel cycling is not enabled. Conditions like these, with stable or slightly decreasing catalyst temperatures, are the preferred criteria for deciding when to enable fuel cycling since they may provide improved catalyst monitoring accuracy. By comparison, when fuel cycling between individual cylinders is enabled at t=0, a good catalyst's temperature rise shown by the dash-dotted temperature line in FIG. 2 attains a significantly higher maximum temperature 23 by the time t=T2, when fuel cycling is terminated, as compared to the dotted temperature line illustrating the characteristics of a catalyst with marginal conversion efficiency and low exothermic heating activity. An expanded time scale is used since the rate of temperature rise is dependent on factors such as catalyst thermal mass (volume, etc.), engine system design, sensor 5 response time characteristic and exothermic activity thereby requiring many cylinder fuel cycling events before the temperature would reach steady state characteristics. The small temperature rise between points 24 and 22 of FIG. 2 illustrate the effects of the associated thermal lags. Temperature characteristics in the operational catalytic converter being evaluated are compared to characteristics stored in memory of the ECU 7 from known catalysts with good and inadequate conversion efficiency performance. In vehicles that use only a small close coupled catalytic converter 10, or no catalyst element 1 at all, the catalyst temperature sensor 5 is placed at the exit of catalyst elements 2, 3 or 16 depending on catalyst configurations used.

FIG. 3 illustrates one of the various alternate methods to cycle the fuel rate between individual cylinder events to obtain alternating conditions between rich ($\lambda$<1) to lean ($\lambda$>1) and returning to rich ($\lambda$<1) to complete one complete rich-lean exhaust air-fuel ratio cycle. Here, the value $\lambda$ is defined as the ratio of each cylinder's exhaust gas air-fuel ratio to the chemical stoichiometric air-fuel ratio. For illustration purposes, the dash dotted line shows the air-fuel ratio characteristics of the respective cylinders' exhaust gases, that feed into the catalyst element, while the cylinders' input fuel rates are varied. The illustration shows an approximate delay caused by the engine's operating cycle.

Each pulse shown in the FIG. 3 represents an individual or group of fuel injector(s) 15 ($I_n$) delivering a specified fuel quantity to each engine cylinder that are connected to the monitored catalyst's 10 or 12 inlet. The selected number of cylinders with rich or lean conditions may be arranged in symmetric or asymmetric groupings by varying both the magnitude of fuel deviations from stoichiometric conditions and the cylinder groupings with common fuel rates. The average air-fuel ratio of one complete rich-lean exhaust gas cycle is typically controlled at or near stoichiometric conditions during fuel cycling operation. Closed loop fuel control operation is also possible by using reduced feedback gain based upon the output of oxygen sensors 13 and/or 21 located on the exhaust system. This is accomplished by adjusting the air-fuel ratios of the respective cylinder groups and allowing use of closed loop engine fuel control, with a reduced level of control feedback gain for stability, while injector fuel rates are cycled to cause catalyst heating. Closed loop control is enabled with feedback from both oxygen sensor 13 the oxygen sensor 21 at the catalyst's outlet.

The effectiveness of catalyst heating, caused by cyclically varying the fuel flow being delivered to an engine's cylinders as illustrated in FIG. 3, can be optimized by adjusting the frequency and magnitude of the rich to lean fuel conditions in adjacent cylinder groups. Varying the number of cylinders, that are grouped together to alternately operate at rich and lean conditions, allows the cycling exhaust gas conditions to match the frequency response characteristics of the catalyst system being heated and monitored for temperature change. The frequency of the rich to lean cycling of exhaust gas conditions are dependent on both the engine speed and the number of grouped cylinders that are operated at richer and leaner than stoichiometric requirements. The frequency and magnitude of air-fuel ratio cycling is adjusted to maximize the catalyst temperature rise while minimizing total vehicle tailpipe HC and CO emission levels. Typically the range of frequencies of cyclic fuel modulation of the exhaust gases range from 5 Hz to 120 Hz and is dependent on both engine and catalytic converter configurations used. Optimal frequency conditions are dependent on the available surface area of active catalyst material, catalyst temperatures and other factors. The magnitude of the fluctuations in fuel quantities and the selected groupings of engine cylinders are selected to minimize changes in engine torque that could be easily perceived by the operator of the engine in an automobile.

Using the present invention, unburned gas concentrations entering the catalytic converter can be significantly increased to cause a step change in catalyst temperatures through cyclic fuel control modulation. The engine control unit 7 may be used to control the aggregate air-fuel ratio entering the catalyst to allow maximum fuel efficiency, cold catalyst heating and or improved catalytic oxidation reactions. Cyclic fuel control modulation is enabled by continuously cycling groups of engine cylinders' fuel injectors between conditions of excess air and then excess fuel relative to stoichiometric conditions. This causes each cylinder group to deviate from the stoichiometric chemical ratio while the aggregate of the gases exiting the catalyst, from consecutively firing groups of engine cylinders composing one complete air-fuel ratio cycle, may be controlled near stoichiometric conditions. Aggregate engine exhaust air-fuel ratio conditions can also be controlled for improved fuel economy or to heat the catalyst quickly after a cold engine start by limiting the average fuel rate so there are excess exhaust oxygen levels, among adjacently firing groups of engine cylinders, when for example, catalyst NOx emissions may be of limited concern.

The position of the temperature sensor at 5 or 19 behind the front surface of the monitored catalyst bed element can also be used to detect a sudden rate of catalyst temperature rise after cold engine starting. In the absence of a significant engine loading change, a sudden change in the catalyst's temperature increase indicates a higher level of exothermic chemical conversion activity within the catalyst. This can occur when a cold catalyst reaches its activation temperature (200–300° C.). Cyclic fuel control modulation may be enabled after detecting a sudden rate of catalyst temperature change, during an ECU 7 calibrated operating range, following cold engine starting to increase the rate of catalyst heating and reduce overall tailpipe 18 emission levels. The magnitude of the steady state catalyst temperature, at which time a larger than normal catalyst temperature rate of change versus time occurs following cold engine starting, can also be used to assess the overall state of a catalyst's conversion efficiency.

Further, under some low temperature operating conditions, cyclic fuel control modulation can be used to increase the catalyst's rate of temperature rise through increased exothermic energy release to improve the overall conversion efficiency of the catalytic converter. This can be beneficial after periods of engine starting when catalyst temperatures are below normal operating temperature. Cyclic fuel control modulation can be used to heat the catalyst more rapidly after engine starting without the use of an additional electrically or belt driven auxiliary air pump. Air pumps are used for some engines to inject air directly into the exhaust system, at locations such as the exhaust manifold 8 or into the catalytic converters 10 or 12, to provide the necessary oxygen needed to fully oxidize a rich exhaust gas mixture having an excess of CO and hydrogen based fuel molecules. Tailpipe 18 emissions can be significantly reduced by providing excess air to oxidize CO or hydrogen based fuel molecules at the catalyst elements' surfaces. Cyclic fuel control may also provide excess oxygen into the catalyst after the temperature sensor 5 is used to identify a sudden increase in the catalyst element's temperature, that's caused by initiation of exothermic energy release. The magnitude of the catalyst's inlet air-fuel ratio fluctuations due to enabling cyclic fuel control modulation are then adjusted using a calibrated level stored within the ECU 7 that is based upon operating parameters such as catalyst temperature 5, engine speed 11, coolant temperature 17, load 9 conditions and other vehicle system parameters. The level of excess chemical energy in the gases with CO, oxygen and hydrogen based fuel molecules produced from the engine's combustion event, due to non-stoichiometric-operation during cyclic fuel control, can be controlled to match the ability of the warm active portions of the catalyst to fully oxidize the gases into non-toxic forms. Catalyst heating using cyclic fuel control is typically disabled once overall catalyst temperatures reach approximately 500° C. Thus; the present invention can be used to quickly heat the catalytic convert so as to operate more efficiently in a shorter period of time.

During low temperature operation of the catalytic converters, 10 (PC1) and/or 12 (MC2), fuel cycling may be used to increase the rate of catalyst heating for various purposes, including raising the catalytic converter temperature so it may reach a high gas conversion efficiency quickly. The criteria used to enable fuel cycling, when a catalyst's temperature is below 400° C., may be determined by monitoring the first catalyst element's 1, 2 or temperature with the ECU 7, within a calibrated temperature range identifying catalyst light-off conditions, for an increase in the second derivative of the catalyst sensor's 5 temperature versus time response characteristics. Typically, the range of expected initiation of catalyst exothermic energy release is at temperatures above 100° C. An increase in the second derivative of the temperature sensor characteristics, not associated with an engine load change, may be used to indicate the initiation of exothermic energy release within the catalyst element. The magnitude of the cyclic fuel control perturbations, when a catalyst's temperature is below 500° C., are controlled using a calibrated multiplier stored in ECU 7 memory, that is a function of past and present parameters such as the catalyst element temperature, coolant temperature, load, engine speed and the highest average second derivative of this temperature characteristic and light-off temperatures recorded during prior catalyst warm up phases.

Both the magnitudes and frequencies of the engine cylinders' exhaust air-fuel ratio fluctuations for assisting cold catalyst heating may be selected from stored values in ECU 7 memory depending on past and present operating parameters to minimize tailpipe 18 emissions. The magnitude and frequency of the air-fuel ratio perturbations may be modified as the catalyst's performance degrades based upon ECU 7 calibrated values. Accuracy of catalyst efficiency monitoring can be improved by also considering the catalyst temperature and time required after a cold start before exothermic reactions begin in the catalyst. The time period prior to a sudden increase in the catalyst's temperature, associated with initiation of exothermnic activity following a cold start, and the temperature characteristic's profile of the step change in catalyst temperatures following a change in cyclic fuel modulation, as illustrated by the points 22 and 23 in FIG. 3, may be together used to better assess the condition of the catalyst element(s) (1, 2, 16) conditions.

One preferred embodiment for determining the gas conversion efficiency of a catalyst would be to use the ECU 7 to measure the initial operating conditions and then compare these values to established thresholds stored in memory that provide accurate catalyst monitoring. Catalyst monitoring and heating is performed during stable operating conditions that will provide consistent heating for accurate monitoring. The operating parameters used to establish stable conditions needed for proper evaluation of catalyst's chemical conversion efficiency include ECU 7 control system inputs for both present and prior vehicle and engine parameters such as engine rotational speed 11, load 9 (intake manifold pressure or airflow), exhaust oxygen levels (13, 21), inlet air, catalyst 5 and coolant temperatures 17, driver throttle demand and vehicle speed. When these operating parameters are within their respective desired ranges, both the monitored catalyst's initial temperature and time rate of temperature change are measured and compared to established ranges also stored in ECU 7 memory.

While all operating parameters described above remain within their desired ranges, the engine's operating fuel rate conditions are changed by rapidly cycling the quantity of fuel delivered in a continuous manner to alternate groups of respective cylinders. This causes exhaust gases, with cycling air-fuel ratios, to flow into the said monitored catalyst element 1, 2 or 16, for the purpose of creating a sudden change in the chemical energy levels of unburned exhaust gas concentrations with increased CO, hydrogen based fuel molecules like HC and oxygen entering the catalytic converter 10 or 12 from manifold 8. Fuel rate cycling is then performed over a defined time period, based upon stored values in ECU 7 memory, to allow the catalyst's temperature sensor 5 to measure a sufficiently significant change. Changes in the catalyst's temperature versus time characteristic's at the specified catalyst location are then monitored during this defined period from a time near initiating fuel cycling and through a ECU 7 calibrated time period subsequent to disabling the air-fuel fluctuations. Cyclic fuel control may be disabled before the end of this calibrated period when a properly functioning catalyst's temperature rise exceeds another calibrated threshold that allows heating to be ended early.

The magnitudes of the air-fuel ratio deviations from stoichiometric are controlled by, for example, calibrated multipliers for modifying the fuel injection time period of each respective engine cylinder. These multipliers are stored in ECU 7 memory and selected as a function of present and past ECU 7 input parameters such as catalyst element temperature, coolant temperature, load, engine speed and time dependent values resulting from these parameters like catalyst heating rates.

Accurate catalyst efficiency monitoring requires having a consistent level of catalyst heating and necessitates low variations in the exhaust gases chemical energy content entering the catalyst's inlet between different testing cycles. A gas stream having a continuous cycle of sequentially alternating engine exhaust gas air-fuel characteristics, as shown in FIG. 3, is one possible method to produce a constant quantity of unburned gases entering the catalyst's 10 or 12 inlet for consistent heating. Alternately, a non-sequential mode of fuel cycling may also be used when the requirements for consistent catalyst heating are less critical, such as for heating following a cold engine start.

The ECU calibrated thresholds are established based upon prior controlled measurements of reference catalysts with marginal conversion efficiency and are dependent on ECU 7 control system input parameters for each vehicle and engine configuration.

Both the monitored catalyst's (1, 2 or 16) average time rate of temperature change and the maximum temperature change occurring since the initiation of fuel rate cycling are measured by the ECU 7 after a calibrated time period to account for the system's thermal lag. The temperature change rate and maximum temperature change are then compared to respective thresholds stored in ECU 7 memory. These thresholds may be obtained, for example, from prior measurements of known representative degraded reference catalysts selected to be at the known threshold gas conversion effectiveness with similar air-fuel ratio fluctuations or theoretical derivation. The stored thresholds are functions of the actual engine 6 operating conditions based upon ECU 7 input parameters such as speeds, temperatures and load. Measured values from the monitored catalyst 10 and/or 12 temperature characteristics falling below the pre-defined calibrated thresholds are generally indications of catalytic converter malfunctions. One or more checks may be performed on the catalyst, to verify malfunctioning under various engine operating conditions, before a catalyst state malfunction indicator 20 is activated.

A catalyst malfunction indicator is activated based upon the relationship between the actual catalyst temperature measurements and these stored thresholds. This is accomplished by, for example, updating the magnitude of a catalyst diagnostic flag counter value stored in the ECU 7 memory with a value determined by comparison of both the maximum average exhaust gas temperature change and the second average time rate of temperature changes with their respective thresholds. A catalyst malfunction indicator 20, such as a diagnostic error code stored in ECU 7 memory, is activated when the catalyst diagnostic flag counter value reaches a predetermined value for the specific engine and exhaust system design configuration.

Both the magnitude and frequency of the air-fuel ratio perturbations from stoichiometric conditions flowing into the said catalyst may be selected from stored values in ECU 7 memory depending on past and present ECU 7 input operating parameters to simultaneously minimize concentrations of CO, HC and nitrogen oxide gases exiting the tailpipe.

The frequency and magnitude of each individual cylinder's air-fuel ratio fluctuations may be selected to cause a large catalyst temperature change with near imperceptible levels-of engine output torque fluctuations. This is accomplished by selecting the magnitude of deviations-from stoichiometric conditions together with the rich and lean cylinder groupings to prevent low frequency torque fluctuations that are noticeable to a vehicle's occupants. Torque fluctuations are also minimized because no interruption in the engine's combustion event (e.g. disabling ignition) is required.

Tailpipe 18 emissions can be minimized by selecting the engine and vehicle operating conditions for initiating cyclic fuel control modulation and the resulting magnitudes of the air-fuel fluctuations so that most CO, HC and nitrogen oxide gases may be oxidized before the catalytic converter's outlet.

It is preferable on engines optionally equipped with motorized throttle control to stabilize engine operation, when possible, during catalyst monitoring. The conditions of engine operation can be temporarily stabilized by dampening throttle movements during the catalyst conversion efficiency detection period to improve the accuracy and consistency of the catalytic converter temperature characteristics evaluation. One method to allow this stabilization is to activate a software filter within the ECU 7 on the output control loop for the motorized throttle body 14 only during catalyst monitoring.

The conditions suitable for accurate catalyst monitoring using catalyst heating are established based upon prior controlled measurements of reference catalysts, with marginal conversion efficiency and are dependent on each vehicle and engine configuration. The selected temperature monitoring location may be established based upon prior measurements from known good and degraded reference catalyst elements of the catalytic converter units that are representative of the threshold criteria for determining a catalyst malfunction, or by theoretical derivations. This location is predetermined so the catalyst's temperature may be measured using a single sensor placed at the specified location, for example, near the said monitored catalyst element's outlet, to allow sensing the aggregate exothermic temperature characteristics associated with a specified level of gas conversion efficiency.

In alternate embodiments for monitoring catalyst efficiency, the system may, for example, determine how quickly the catalyst temperature increases to a calibrated threshold above the initial temperature after enabling cycling fuel control for catalyst heating or determine the rate of change in catalyst temperature over time. In the case of determining how quickly the catalyst temperature increases to a temperature above a predetermined threshold value during cycling fuel control, the desired conditions for accurate catalyst monitoring are first determined by ECU 7, as in the first embodiment, and then cyclic fuel control is enabled until the catalyst's temperature rises to a defined calibrated threshold above its initial value measured prior to initiation of cyclic fuel control. The ECU 7 monitors the catalyst's condition by determining the time difference between, when the catalyst temperature's increase above its initial value reaches a calibrated delta temperature rise threshold, and the time of a temperature inflection point indicating an increased rate of catalyst temperature change due to fuel cycling. This is illustrated in FIG. 2 where the inflection point 22 shows when-the rate of catalyst heating increases, shown by the first derivative of catalyst temperature exceeding a calibrated threshold, and the point 23 illustrates when the maximum catalyst temperature is attained based upon the sensor 5 reaching the ECU 7 defined delta temperature threshold. Cyclic fuel control may be disabled at this time 23 or continued for a brief calibrated period. The time difference required for the catalyst temperature to increase from the inflection point 22 to the maximum temperature attained at point 23 determines the rate of catalyst heating caused by cycling fuel control and correspondingly the catalyst's condition. The difference between this measured time period and the calibrated time period stored in ECU 7 memory determines how a malfunction indicator counter is incremented. A catalyst malfunction indicator 20 is activated when the malfunction indicator counter reaches a threshold. In this alternative embodiment, the time period between point 24 and 22 in FIG. 2 is not critical since it's mainly dependent on the thermal lag caused by the engine 6, sensor 5 location and exhaust system configuration and typically varies based on exhaust gas energy levels.

As is apparent to one skilled in the art from reading the specification, the present invention is not limited to the above embodiments but may be modified and changed in various respects without departing from the scope or spirit of the invention. For example, two or more standard temperature sensor may be used, rather than one standard temperature sensor. Further, the cyclic fuel control could be provided by another computer rather than an ECU 7 such as a body computer. The engine may be a 4 cylinder, 6 cylinder, or more cylinder engine and have configurations such as an opposed, "V-type" or straight cylinder arrangement. Finally, the invention could be applied to various fuel injection systems such as a dual port injector system. Thus, the invention is intended to cover alternatives, modifications, and equivalents, which may be included within the spirit and scope of the invention as defined by the claims.

All publications, patents, and patent applications cited herein are hereby incorporated by reference in their entirety for all purposes.

What is claimed is:

1. A method of heating a catalytic converter of an internal combustion engine, including the steps of:
   providing at least one temperature sensor in said catalytic converter;
   sensing conditions from past and present engine control system parameters together with measurements of catalytic converter efficiency to determine sufficient levels of exothermic chemical reactions within the said catalytic converter; and
   initiating cycling of exhaust gases' air-fuel ratios, from selected engine cylinders within the sensed limits of engine cylinder misfire, to produce air-fuel variations entering said catalytic converter so as to provide conditions sufficient for heating the catalyst to a temperature that reduces emission concentrations exiting said catalytic converter.

2. A method according to claim 1, whereby the quantity of fuel delivered to alternate groupings of engine cylinders are varied between non-stoichiometric conditions of excess fuel and insufficient fuel to cause sequentially alternating exhaust gas conditions entering the catalyst.

3. A method according to claim 2, further comprising the steps of:
   controlling the fuel quantity delivered to select cylinders of an internal combustion engine with a controller in an alternating manner for causing exhaust gas conditions that sufficiently deviate from extremes of normal engine stoichiometric closed loop fuel control conditions so as to increase the chemical energy content of the exhaust gases entering said catalytic converter; and
   initiating said alternating fuel control only during predefined operating conditions to cause said heating of said catalytic converter.

4. The method of claim 1, wherein said step of controlling input fuel and air conditions includes operate the engine with large cyclic variations in the quantity of fuel delivered to each cylinder that sufficiently deviates from normal operation so as to cause a rise in said catalyst temperature as detected by said temperature sensor at a second temperature sufficient to cause said catalytic converter to operate at an operating temperature so that said catalytic converter effectively purifies said emissions from said catalytic converter.

5. The method of claim 4 wherein said step of controlling input fuel and air conditions further includes vary delivered fuel quantities to each cylinder, that feeds exhaust gases into a catalyst element of said catalytic converter so as to cause air-fuel ratio conditions sufficiently deviating from normal stoichiometric operation with the exhaust gases of alternating cylinders or groupings thereof feeding into the said catalyst to be alternately richer or leaner than chemical stoichiometric conditions, which increases the level of exothermic energy available to combine chemically at the active surfaces of said catalyst for producing a temperature change.

6. The method according to claim 1, wherein the step of controlling operates so that the groupings of cylinders' exhaust gases' air-fuel conditions, from selected engine cylinders are modified to minimize engine torque fluctuations while causing a change in quantities of chemically reactive gases entering said catalytic converter between richer and leaner than stoichiometric.

7. A method of heating a catalytic converter of an internal combustion engine including the steps of:
   providing at least one temperature sensor in said catalytic converter;
   sensing, with said temperature sensor, a first temperature indicating that a catalyst in said catalytic converter is not operating at an operating temperature at which said catalyst will effectively purify emissions from said catalytic converter;
   measuring other engine and vehicle parameters in addition to the catalyst temperature for comparing to respective threshold values that determine initiation of catalyst heating;
   initiating a change in the fuel quantities, delivered to individual engine cylinders connected to said catalytic converter, that differs from normal engine operation;
   adjusting a magnitude of fuel delivered to selected ones of each of said individual engine cylinders such that the air-fuel ratio characteristics of the exhaust gases entering said catalytic converter cycle between levels alternating from leaner than stoichiometric to richer than stoichiometric conditions so that said catalytic converter increases in temperature faster than under normal operating conditions without said adjusting the magnitude of fuel delivered to each individual engine cylinder; and adjusting the magnitude of fuel to each of said engine cylinders, individually, such that the air-fuel ratio characteristics of the exhaust gases entering said catalytic converter cycle is approximately at stoichiometric conditions when said temperature sensor is measuring a second temperature is indicative of said catalytic converter operating at an operating temperature such that said catalytic converter is effectively purifying said emissions output from said catalytic converter.

8. The method of claim 7, further comprising the steps of:

controlling the time duration of fuel delivered to each of said engine cylinders, individually, such that the air-fuel ratio characteristics of the exhaust gases entering said catalytic converter alternate between rich and lean conditions;

controlling frequency of the lean to rich to lean cycle of exhaust gases feeding into said catalytic converter by delivering to groupings of firing cylinders a fuel quantity, that causes each cylinder in the group to have a common air-fuel ratio, either richer or leaner than stoichiometric;

producing a gas stream entering the catalyst that cycles between non-stoichiometric conditions having exhaust air-fuel ratios alternating from lean and rich conditions; and monitoring the catalyst temperature for comparing to threshold values that determine the termination of catalyst heating, and wherein said leaner than stoichiometric conditions is such that $\lambda$ is more than 1.07 and said richer than stoichiometric conditions is such that $\lambda$ s less then 0.93.

9. An engine control system for heating a catalytic converter of an internal combustion engine, comprising:

a temperature sensor disposed in said catalytic converter; and an electronic engine control system configured to:
sensing with said temperature sensor a first temperature condition together with other past and present control system parameters indicating that said catalytic converter has reached conditions sustaining exothermic chemical reactions within the catalyst; and controlling cycling of exhaust gases' air-fuel ratios, from selected engine cylinders, to produce air-fuel variations of and thereby produce additional quantities of chemically reactive gases entering said catalytic converter so as to provide conditions sufficient for heating the catalyst to a temperature that reduces emission concentrations exiting said catalytic converter.

10. The system of claim 9, further comprising:

a second temperature sensor disposed in said catalytic converter at a different location than said first temperature sensor, said second temperature sensor for determining a temperature of a different catalyst element than said first sensor so as to ensure that both catalyst elements are heated to a temperature sufficient for said catalytic converter to operate effectively to purify said emissions from said catalytic converter.

11. The system of claim 9 wherein said step of controlling input fuel and air conditions further includes modifying the delivered fuel quantities to each cylinder for preventing operation within the detected limits of engine misfire to thereby more consistently increase the level of exothermic energy available to combine chemically at the active surfaces of said catalyst for producing a temperature change while minimizing air pollutants.

12. The system of claim 11, wherein said step of controlling input fuel and air conditions includes operating the engine with large cyclic variations in the quantity of fuel delivered to each cylinder that sufficiently deviates from normal operation so as to cause a rise in said catalyst temperature as detected by said temperature sensor at a second temperature sufficient to cause said catalytic converter to operate at an operating temperature so that said catalytic converter effectively purifies said emissions from said catalytic converter.

13. The system according to claim 9, wherein the electronic engine controller modifies the exhaust gases' air-fuel conditions from selected engine cylinders to cause a change in quantities of chemically reactive gases entering said catalytic converter between richer and leaner than stoichiometric, while remaining outside the detected limits of engine cylinder misfiring.

14. A method of heating a catalytic converter of an internal combustion engine, comprising the steps of:

providing at least one temperature sensor in said catalytic converter;

sensing with said temperature sensor a first temperature indicating that said catalytic converter is operating at conditions producing exothermic chemical reactions; and changing quantities of chemically reactive gases by varying selected engine cylinders exhaust gases' air-fuel ratios entering said catalytic converter so as to heat the catalyst to an increased temperature sufficient to reduce emission concentrations exiting said catalytic converter.

15. A method according to claim 14, whereby the step of changing quantities of chemically reactive gases entering said catalytic converter includes changing the amount of hydrocarbon, CO, and oxygen.

16. A method according to claim 14, further comprising the steps of:

sensing a second temperature condition of said catalytic converter at a second time period with said at least one temperature sensor;

comparing actual catalytic converter temperature versus time characteristic as derived from said first temperature conditions and said second temperature conditions to reference values stored in memory and determining an existence of a malfunctioning catalytic converter based upon said comparison between actual and reference catalytic converter temperature characteristics.

17. The method according to claim 16, whereby results from said comparisons to determine an existence of a malfunctioning catalytic converter are used to modify both the starting point for initiating cycling of exhaust gases' air-fuel ratios and their magnitudes to heat the catalyst when the temperature is between approximately 100° C. and 500° C.

18. The system according to claim 14, wherein the step of changing quantities of chemically reactive gases operates so that the exhaust gases entering said catalytic converter varies between conditions richer and leaner than stoichiometric.

19. A method according to claim 17, wherein the first temperature is below 200° C.

20. A method according to claim 14, wherein the first temperature is below 200° C.

21. A method of determining the gas conversion efficiency of a catalytic converter connected to an engine having one or more cylinders, including the steps of:
- measuring an initial temperature for exhaust gases in a said catalytic converter at one or more location(s);
- monitoring temperature characteristics of said catalytic converter together with past and present engine control unit parameters to determine stable operating conditions suitable for providing consistent evaluation of gas conversion efficiency characteristics of said catalytic converter;
- activating an engine control unit for cycling of fuel levels delivered to selected engine cylinders, each of said selected engine cylinder's gas flow having conditions of either excess fuel or excess air that sufficiently deviate from stoichiometric chemical requirements;
- cycling a quantity of fuel delivered to alternate groups of engine cylinders to provide feed gases to said catalytic converter with consistent levels of chemical energy for the purpose of creating a sufficient change in the unburned exhaust gas entering said catalytic converter during a predetermined time period;
- measuring a temperature versus time profile at said location of said catalytic converter from a time near initiation of said cycling a quantity of fuel delivered to alternate groups of engine cylinders and subsequent to disabling said cycling;
- comparing said measured temperatures to temperature profiles stored in a memory, said temperature profiles representative of a near malfunctioning catalytic converter;
- determining from said monitored catalytic converter's temperature profile a second average time rate of temperature change and the corresponding maximum average exhaust gas temperature change attained since said initial temperature measurement;
- comparing said second average time rate of temperature change in a calibrated time period with temperature change rates stored in said memory;
- comparing a maximum average exhaust gas temperature change attained since said initial temperature measurement, after another time period, with a delta temperature threshold value stored in said memory;
- updating a magnitude of a catalyst diagnostic flag counter value stored in said memory by a value determined by a comparison of the maximum average exhaust gas temperature change and the second average time rate of temperature change after a calibrated time period for said thresholds stored in said memory, said values depending on past and present operating parameters; and activating a catalyst state malfunction indicator when the catalyst diagnostic flag counter value reaches a predetermined value.

22. A method according to claim 21, whereby magnitudes of the induced fluctuations in exhaust air-fuel ratio for each respectively firing engine cylinder are selected from values stored in said memory depending on past and present operating parameters.

23. A method according to claim 21, whereby a frequency of cycling said fuel rate to the engine cylinders is selected from stored values in said memory depending on past and present operating parameters in order to maximize a temperature rise of the engine exhaust gases.

24. A method according to claim 21, whereby magnitude and frequency of the air-fuel ratio perturbations from stoichiometric conditions flowing into said catalytic converter are selected from stored values in said memory depending on past and present operating parameters.

25. A method according to claim 21, whereby the engine operating conditions, for initiating cyclic fuel control modulation to cause exhaust air-fuel ratio fluctuations, are selected so as to minimize concentrations of CO, HC and nitrogen oxide gases exiting the catalytic converter.

26. A method according to claim 21, whereby the magnitude and timing of an intentionally induced rise in catalyst temperature is selected together with an appropriately positioned temperature measuring device based upon the engine design characteristics to allow detection of an unacceptable degradation in said monitored catalytic converter conversion efficiency.

27. A method according to claim 21, whereby the catalytic converter temperature is measured using a single temperature sensor placed at the specified location, that has been predetermined to allow sensing the aggregate exothermic temperature characteristics of said catalytic converter below a specified level of gas conversion efficiency.

28. A method according to claim 21, whereby a duration of the time period used for detection of catalytic converter efficiency performance is selected to provide accurate monitoring of said catalytic converter's efficiency performance.

29. A method according to claim 21, whereby both frequency and magnitude of each individual cylinder's air-fuel ratio fluctuations are selected to cause a sufficiently large catalyst temperature change to determine efficiency of said catalytic converter, without interrupting the engine's combustion event and ignition.

30. A method according to claim 21, whereby said time period that the catalytic converter operates below 500° C. may be reduced by detecting the initiation of catalyst exothermic energy release at temperatures above 100° C. and enabling catalyst heating using cyclic fuel control modulation.

31. A method according to claim 21, whereby the conditions of engine operation can be temporarily stabilized during the catalytic converter's conversion efficiency detection period on engines having motorized throttle control, so as to improve accuracy and consistency of said catalytic converter temperature characteristics evaluation.

32. A method according to claim 21, whereby the engine control unit is used to control aggregate air-fuel ratio entering the catalytic converter, during catalyst heating using cyclic fuel control modulation, to be at a desired level relative to stoichiometric conditions.

33. A method according to claim 24, whereby the magnitude and frequency of the air-fuel ratio perturbations are modified as the catalytic converter's performance degrades based upon past and present operating parameters.

34. A method of heating a catalytic converter of an internal combustion engine, including the steps of:
- varying the delivered fuel quantities to each cylinder, that feeds exhaust gases into a catalyst element so as to cause air-fuel ratio conditions sufficiently deviating from normal stoichiometric operation with the exhaust gases of alternating cylinders or groupings thereof feeding into the said catalyst to be alternately richer or leaner than chemical stoichiometric conditions, which increases the level of exothermic energy available to combine chemically at the active surfaces of said catalyst for producing a temperature change; and
- operating the engine with large cyclic variations in the quantity of fuel delivered to each cylinder that sufficiently deviates from normal operation so as to cause a significant rise in said catalyst temperature change.

35. A method according to claim 34, whereby the quantity of fuel delivered to alternate groupings of engine cylinders are varied between non-stoichiometric conditions of excess fuel and insufficient fuel to cause sequentially alternating exhaust gas conditions entering the catalyst.

36. A method according to claim 35, further comprising the steps of:
controlling the fuel quantity delivered to select cylinders of an internal combustion engine with a controller in an alternating manner for causing exhaust gas conditions that sufficiently deviate from extremes of normal engine stoichiometric closed loop fuel control conditions so as to increase the chemical energy content of the exhaust gases entering said catalytic converter; and
initiating said alternating fuel control only during predefined operating conditions to cause said heating of said catalytic converter.

37. A method of heating a catalytic converter of an internal combustion engine including the steps of:
measuring engine and vehicle parameters including the catalyst temperature for comparing to respective threshold values that determine the initiation of catalyst heating;
initiating a change in the fuel quantities, delivered to individual engine cylinders connected to said catalytic converter, that differs from normal engine operation;
adjusting the magnitude of fuel delivered to each of said individual engine cylinder such that the air-fuel ratio characteristics of the exhaust gases entering said catalytic converter cycle between levels alternating from leaner than stoichiometric to richer than stoichiometric conditions so that said catalytic converter increases in temperature faster than under normal operating conditions without said adjusting the magnitude of fuel delivered to each individual engine cylinder.

38. The method of claim 37, further comprising the steps of:
controlling timing of fuel delivered to each of said individual engine cylinders such that the air-fuel ratio characteristics of the exhaust gases entering said catalytic converter alternate between rich and lean conditions;
controlling frequency of the lean to rich to lean cycle of exhaust gases feeding into said catalytic converter by delivering to groupings of firing cylinders a fuel quantity, that causes each cylinder in the group to have a common air-fuel ratio, either richer or leaner than stoichiometric;
producing a gas stream entering the catalyst that cycles between non stoichiometric conditions having exhaust air-fuel ratios alternating from lean and rich conditions; and
monitoring the catalyst temperature for comparing to threshold values that determine the termination of catalyst heating, and wherein said leaner than stoichiometric conditions is such that $\lambda$ is more than 1.07 and said richer than stoichiometric conditions is such that $\lambda$ is less then 0.93.

39. A method of determining the gas conversion efficiency of a catalytic converter composed of one or more catalysts and connected to an engine having one or more cylinders controlled by an engine control unit, including the steps of:
measuring initial temperature conditions of a catalytic converter at one or more location(s);
determining from past and present engine control unit parameters and monitored temperature characteristics of said catalytic converter the conditions suitable for providing consistent evaluation of gas conversion efficiency characteristics of said catalytic converter during a first period;
activating an engine control unit to cause a temporary duration of changes in selected engine cylinders' properties, such properties differing from said first period, for effecting a change in the exhaust gases' chemical energy levels entering said catalytic converter during a second time period causing a significant temperature change exceeding normal exhaust temperature operational fluctuations;
measuring changes in said catalytic converter's temperature versus time characteristic's profile subsequent to changing exhaust gas chemical energy levels entering said catalytic converter from such temporary changes activated in second time period;
comparing said measured temperature profile changes to reference temperature profiles stored in a memory, said reference profiles representative of desired catalyst diagnostic limit conditions;
updating the magnitude of a catalyst diagnostic status indicator stored in memory based upon comparison of said measured and said reference catalytic converter temperature profiles; and
activating a catalyst state malfunction indicator when the catalyst diagnostic status indicator value reaches a predetermined limit.

40. A method of determining the gas conversion efficiency of a catalytic converter, composed of one or more catalyst elements, connected to an engine having one or more cylinders that are controlled by an engine control unit, including the steps of:
measuring a first temperature condition of said catalytic converter at a first time period with one or more temperature sensors;
cycling gas mixture properties entering said catalytic converter between conditions significantly leaner and richer than stoichiometric operating conditions by varying delivered fuel quantities to said one or more cylinders;
measuring a second temperature condition of said catalytic converter at a second time period with said one or more temperature sensors;
comparing actual catalytic converter temperature versus time characteristic as derived from said first temperature and said second temperature to reference values stored in memory and determining an existence of a malfunctioning catalytic converter based upon said comparison between actual and reference catalytic converter temperature characteristics.

41. A method according to claim 40, wherein said step of cycling gas mixture properties includes varying the delivered fuel quantities to each said cylinder, that feeds exhaust gases into a catalyst element, so as to cause air-fuel ratio conditions sufficiently deviating from normal stoichiometric operation with the exhaust gases of alternating cylinders or groupings thereof feeding into the said catalyst to be alternately richer or leaner than chemical stoichiometric conditions, which increases the level of exothermic energy available to combine chemically at the active surfaces of said catalyst for producing a temperature change.

42. A method according to claim 41, whereby the quantity of fuel delivered to alternate groupings of engine cylinders are varied between non-stoichiometric conditions of excess fuel and insufficient fuel to cause sequentially alternating exhaust gas conditions entering the catalyst.

43. A method according to claim 42, further comprising the steps of:

controlling the fuel quantity delivered to select cylinders of an internal combustion engine with a controller in an alternating manner for causing exhaust gas conditions that sufficiently deviate from extremes of normal engine stoicchiometric closed loop fuel control conditions so as to increase the chemical energy content of the exhaust gases entering said catalytic converter; and initiating said alternating fuel control only during predefined operating conditions to cause said heating of said catalytic converter.

44. A method according to claim 40, whereby a magnitude and timing of an intentionally induced rise in catalytic converter temperature is selected together with an appropriately positioned temperature measuring device based upon the engine design characteristics to allow detection of an unacceptable degradation in said monitored catalytic converter conversion efficiency.

45. A method according to claim 40, whereby the catalytic converter temperature is measured using a single temperature sensor placed at the specified location, that has been predetermined to allow sensing the aggregate exothermic temperature characteristics of said catalytic converter below a specified level of gas conversion efficiency.

46. A method according to claim 40, whereby a duration of the time period used for detection of catalytic converter efficiency performance is selected to provide accurate monitoring of said catalytic converter's efficiency performance.

47. A method according to claim 40, whereby both frequency and magnitude of each individual cylinder's air-fuel ratio fluctuations are selected to cause a sufficiently large catalyst temperature change for determining the efficiency of said catalytic converter, without interrupting the engine's combustion event and ignition.

48. A method according to claim 40, whereby said time period that the catalytic converter operates below 500° C. may be reduced by detecting the initiation of catalyst exothermic energy release at temperatures above 100° C. and enabling catalyst heating using cyclic fuel control modulation.

* * * * *